(12) United States Patent
Lee et al.

(10) Patent No.: US 6,754,426 B2
(45) Date of Patent: Jun. 22, 2004

(54) HAND-HELD OPTICAL FIBER CUTTING APPARATUS

(75) Inventors: Wen-Yeu Lee, Tai-Nan (TW); Ta-Hsin Chou, Kaohsiung (TW)

(73) Assignee: Industrial Technology Research Institute (TW)

( * ) Notice: Subject to any disclaimer, the term of this patent is extended or adjusted under 35 U.S.C. 154(b) by 151 days.

(21) Appl. No.: 10/092,428

(22) Filed: Mar. 8, 2002

(65) Prior Publication Data

US 2003/0113087 A1 Jun. 19, 2003

(30) Foreign Application Priority Data

Dec. 13, 2001 (TW) ........................................ 90221766 U

(51) Int. Cl.[7] ................................................. G02B 6/00
(52) U.S. Cl. ......................................... 385/136; 225/93
(58) Field of Search ................................. 385/136, 137, 385/147; 225/93, 96.5, 2; 29/869; 451/41

(56) References Cited

U.S. PATENT DOCUMENTS

| | | | | |
|---|---|---|---|---|
| 4,473,942 A | * | 10/1984 | Ridgway | 29/869 |
| 5,024,363 A | * | 6/1991 | Suda et al. | 225/96.5 |
| 5,104,021 A | * | 4/1992 | Seike et al. | 225/2 |
| 5,123,581 A | * | 6/1992 | Curtis et al. | 225/2 |
| 5,501,385 A | * | 3/1996 | Halpin | 225/96 |
| 5,842,622 A | * | 12/1998 | Mansfield et al. | 225/96.5 |
| 6,099,392 A | * | 8/2000 | Wiegand et al. | 451/41 |
| 6,189,757 B1 | * | 2/2001 | Yoshida et al. | 225/96 |

* cited by examiner

Primary Examiner—Ellen E. Kim
(74) Attorney, Agent, or Firm—Bacon & Thomas, PLLC

(57) ABSTRACT

A hand-held optical fiber cutting apparatus comprises a base, and a cutting device and a bending device, comprised of a pushing shaft mounted on the cutting device, that slide to perform cutting. The base includes an optical fiber guiding support to receive the optical fiber to be cut. Via a manual switch, an optical fiber clamp pivotably mounted onto the base can rotatably open or close to clamp the optical fiber. The bending device further includes a bending base pivotably assembled with the base. To cut the optical fiber, the cutting device and the pushing shaft slide toward the clamped optical fiber that is sequentially precut via a cutting blade of the cutting device and then cut off via a rotation of the bending base pushed by the pushing shaft.

17 Claims, 6 Drawing Sheets

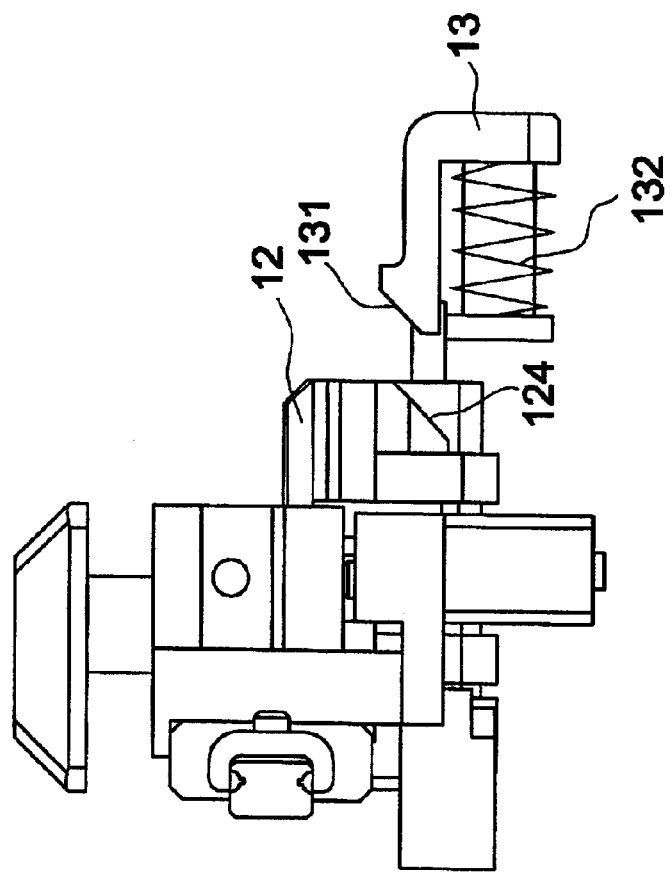
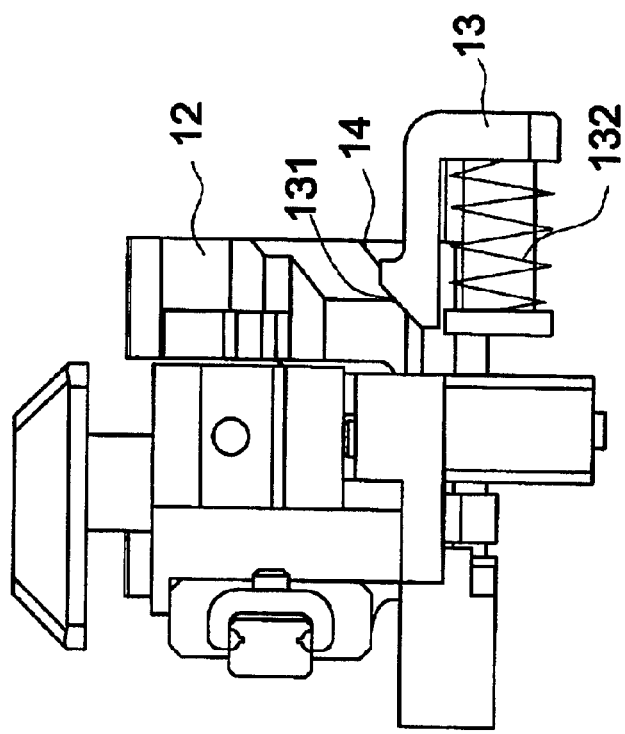
FIG.4B
FIG.4A

HAND-HELD OPTICAL FIBER CUTTING APPARATUS

FIELD OF THE INVENTION

The invention relates to an optical fiber cutting apparatus. More particularly, the invention provides a hand-held optical fiber cutting apparatus that can be manipulated by a single operator to cut off an optical fiber, and is suitable for use in limited workspace.

BACKGROUND OF INVENTION

As the demand of channel supports for data and signal transfers is increasing, optical fibers provide many advantages including a low signal deterioration, a large frequency band, no conductivity, no negative irradiation, no inductance effect, a small size, a small radius of curvature, and a lightweight. Optical fibers thus adequately accompany the development of high order digital multiplex technology and opto-electronic devices. Currently, optical fiber communication is already a principal support for network signal transfer.

The installation of optical fibers is usually under the form of optical fiber cables. Exposed to various environmental factors that may cause damages and deterioration, optical fiber cables necessitate maintenance or replacement. The glass optical fibers within the optical fiber cables are extremely thin (diameter of about 125 mm). Moreover, during the maintenance, a cutting operation of optical fiber necessitates a high accuracy and relatively flat cutting face. Otherwise, after the welding operation, the optical fiber may present a negative light scattering effect. Optical fiber cutting technology thus needs to be developed.

Presently, conventional optical fiber cutting apparatuses need to be operated on a large platform. The cutting operation is therefore difficult to achieve in limited workspace. Conventionally, the cutting operation of optical fiber by means of a traditional hand-held cutting apparatus is performed through, first, adequately disposing the optical fiber on the working platform. The optical fiber is usually fixedly positioned via a flexible element pressing one end of the optical fiber while the operator via one hand presses on another end. After the operator has manually manipulated a cutting blade rotated onto the surface of the optical fiber to achieve a precut trace, the operator then cuts off the optical fiber via his hand.

Because the operator manually manipulates the cutting blade and its rotation, the cutting location and the precutting depth cannot be accurately controlled. Moreover, the cutting face of the optical fiber is not flat.

SUMMARY OF THE INVENTION

It is therefore a principal object of the invention to provide a hand-held optical fiber cutting apparatus that enables an accurate control of the precut depth and allows a single operator to effectively achieve the cutting operation.

To accomplish the above and other objectives, a hand-held optical fiber cutting apparatus of the invention comprises a base over which a cutting device and a bending device, comprised of a pushing shaft mounted onto the cutting device, slide to perform cutting. The base supports a pair of optical fiber guiding supports that are co-axially mounted thereon to receive the optical fiber to be cut. An optical fiber clamp is pivotably mounted to the base with a push-button switch that controls the opening or closing rotation of the optical fiber clamp. A sliding base is slidably mounted to the base and a lower magnet is fixedly attached onto the base. A lower clamping block is placed between the optical fiber guiding supports. An upper clamping block and an upper magnet are mounted on a lower side of the optical fiber clamp respectively vis-à-vis the lower clamping block and the lower magnet. Being fixedly assembled with the slide base, the cutting device slides along with the slide base over the base, the cutting device being provided with a cutting blade at an extremity thereof. The bending device further comprises a bending base pivotably assembled with the base, and the pushing shaft of the bending device is fixedly mounted onto a lower side of the cutting device to rotatably deviate the bending base via the slide of the cutting device.

To perform a cutting operation with the above apparatus, the optical fiber clamp is first opened by means of the push-button switch to dispose the optical fiber to be cutted on the optical fiber guiding supports. The optical fiber clamp then is closed to tightly hold the optical fiber, and the cutting device and the bending device are manually pushed toward the optical fiber to achieve its cutting. The optical fiber cutting is performed through, first, a precut of the optical fiber by the cutting blade, followed by an effective cut off achieved via a rotary deviation of the bending base pushed by the pushing shaft.

BRIEF DESCRIPTION OF THE DRAWINGS

The drawings included herein provide a further understanding of the invention and, incorporated herein, constitute a part of the invention disclosure. A brief introduction of the drawings is as follows:

FIG. 4A and FIG. 4B are schematic views of the push-button switch in different configurations.

DESCRIPTION OF THE PREFERRED EMBODIMENTS

Figure 1:
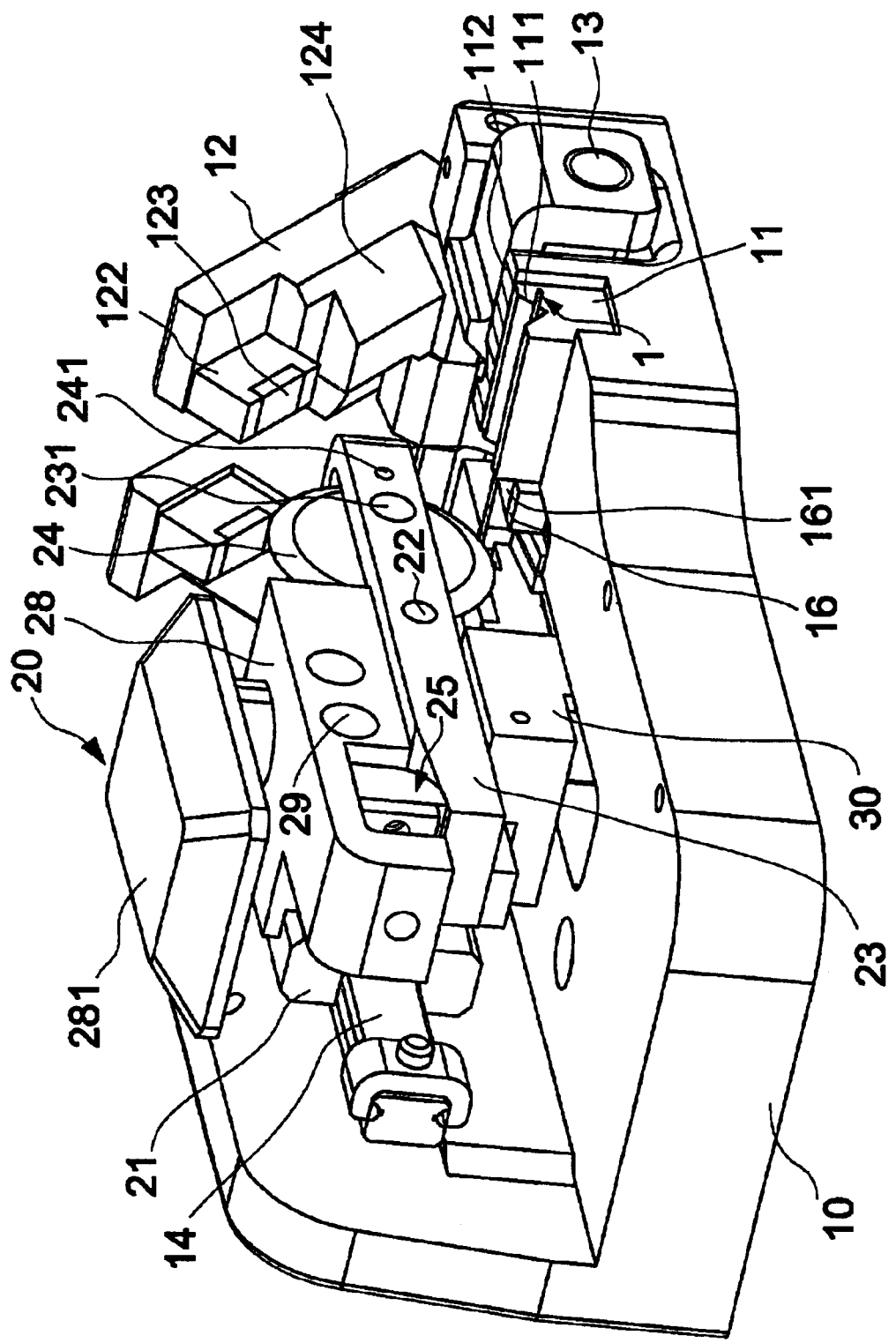
FIG. 1 is a perspective view schematically showing a manually operated optical fiber cutting apparatus according to an embodiment of the invention.
Figure 2:
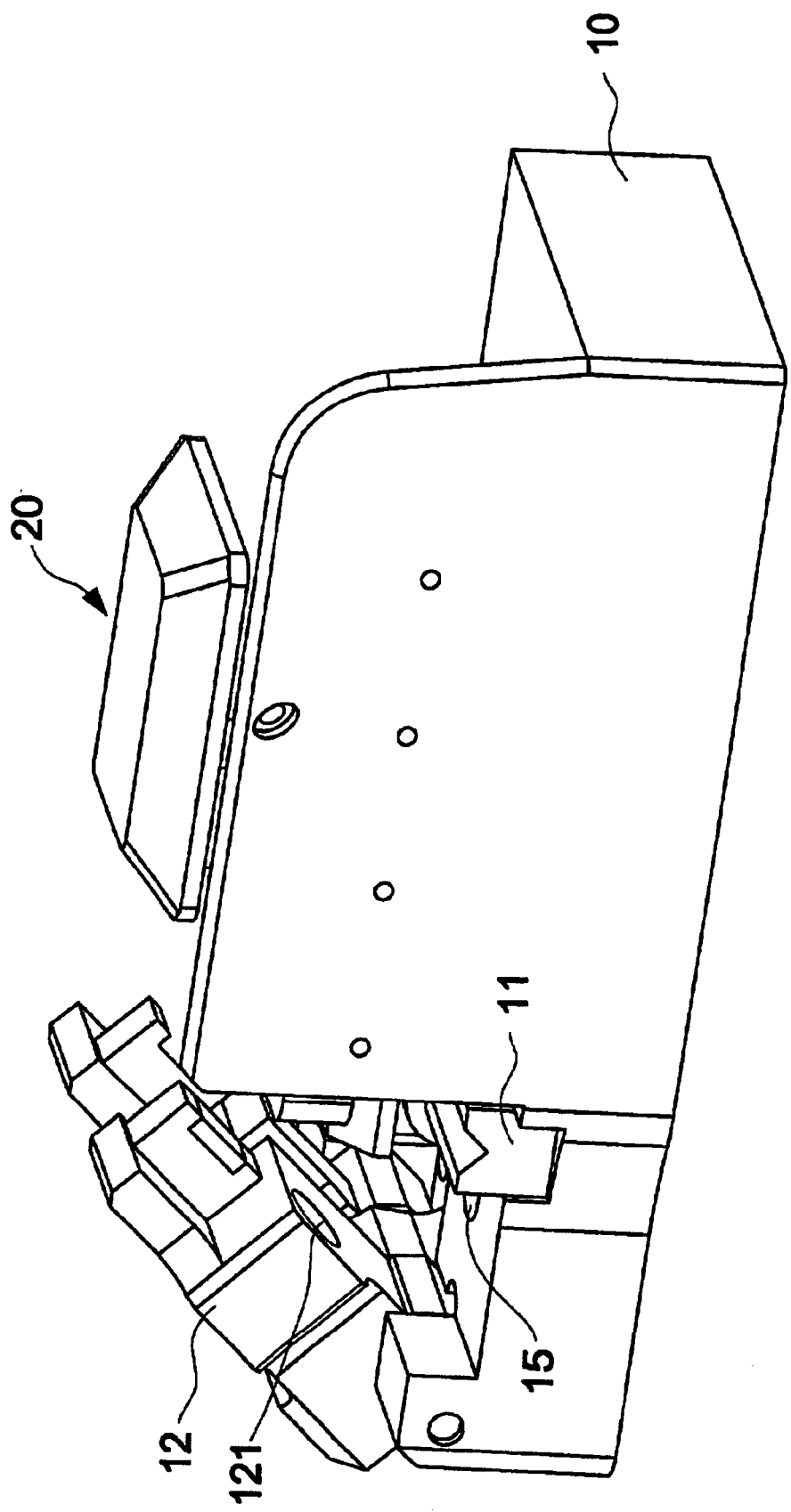
FIG. 2 is a schematic view of the upper and lower magnets.

Referring now to FIG. 1 and FIG. 2, two perspective views schematically illustrate a hand-held optical fiber cutting apparatus according to an embodiment of the invention. The hand-held optical fiber cutting apparatus comprises a base 10, a cutting device 20, and a bending device 30. The base 10 supports a pair of optical fiber guiding supports 11 and an optical fiber clamp 12. The optical fiber guiding supports 11 are co-axially mounted on a left and right side of the base 10. An optical fiber clamp 12 which rotation is controlled via a push-button switch 13 is further pivotably mounted to the base 10. In addition, a slide rail 14 and a lower magnet 15 are fixedly mounted onto the base 10. A pair of lower clamping blocks 16 is mounted between the optical fiber guiding supports 11. The optical fiber guiding supports 11 include a V-shaped groove 111 defined on an upper side thereof to receive an optical fiber 1. The desired length of optical fiber 1 to be cut is accurately determined via a ruler 112. On a lower side of the optical fiber clamp 12 are placed an upper magnet 121 and an upper clamping block 122 (see FIG. 3) that are respectively vis-a-vis the lower magnet 15 and the lower clamping block 16. A top face of the lower clamping block 16 and a bottom face of the upper clamping block 122 are provided with rubber pads 161, 123.

Figure 3:
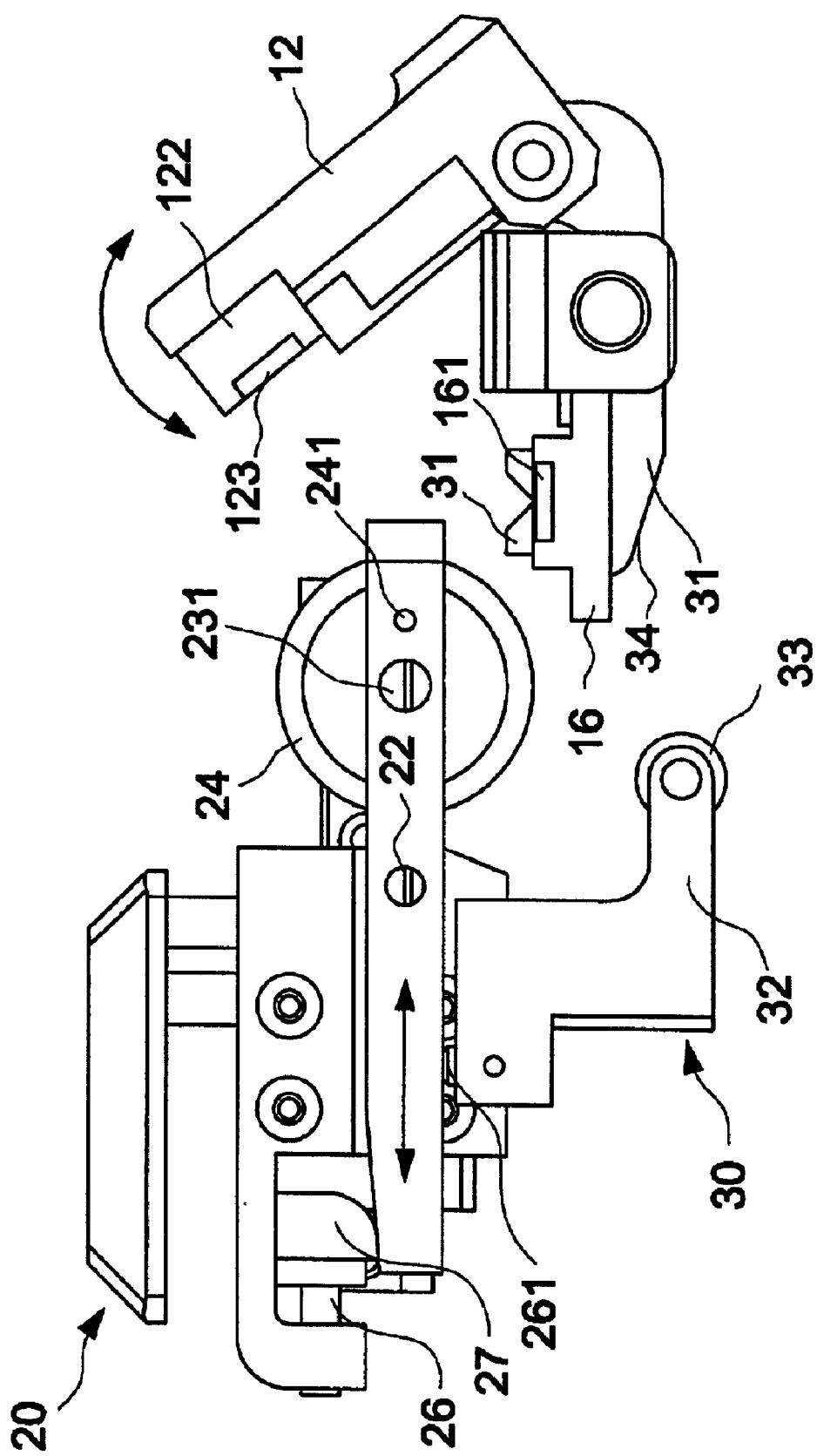
FIG. 3 is a schematic view of the optical fiber clamp and the bending device.

As shown in FIG. 1, the cutting device 20 includes a slide block 21 that slides along a slide rail 14. The slide block 21 further fixedly assembles with a slide base 28 via screw-bolt assembly fitted through screwed holes 29 of the slide base 28. A pushing block 281 is further fixedly mounted on the slide base 28. The cutting device 20 includes a connecting rod 23 that is pivotably mounted via a pivot 22. At one extremity of the connecting rod 23 is pivotably mounted a cutting blade 24 while a trimming device 25 is mounted to another extremity of the connecting rod 23. FIG. 3 illustrates a schematic view of the optical fiber clamp and the bending device. For the sake of clearer description, all the elements are not shown in FIG. 3. As shown in FIG. 3, the adjustment device 25 includes a adjustment screw 26, a adjustment slider 27, and a adjustment set screw 261. The adjustment device 25 is mounted in leverage via a leverage pivot 22. Hence, the adjustment screw 26 rotating the adjustment slider 27 causes either an upward or downward displacement of an extremity of the connecting rod 23, which thereby adjusts the depth of precut trace caused by the pressure of the cutting blade 24 on the optical fiber 1. The cutting blade 24 can be, for example, a wheel blade that is pivotably mounted onto the connecting rod 23 via a pivot 231 and, furthermore, fixedly immobilized with respect to the connecting rod 23 via a screw-bolt assembly 241. The effective cutting contact zone of the cutting blade 24 can be changed via loosing the screw-bolt assembly 241 and rotating the cutting blade 24 around the pivot 231. Thereby, the replacement of the cutting blade 24 can be reduced.

As shown in FIG. 3, the bending device 30 comprises a bending base 31 that is pivotably mounted onto the base 10. The bending base 31 is provided with a bending blade 35 thereon (see FIG. 6), and has an oblique face 34 on a lower side. The bending device 30 further comprises a pushing shaft 32 to push the folder base 31 in movement. The pushing shaft 32 is fixedly mounted onto a lower side of the cutting device 20, and is provided with a roller 33 at an extremity thereof; the pushing shaft 32 hence moves along a displacement of the cutting device 20. When cutting is not performed, the cutting edge of the bending blade 35 is substantially coplanar with the top face of the lower clamping block 16, below the V-shaped grooves 111. Hence, the optical fiber 1 to be cut can be placed on the V-shaped grooves 111.

Figure 5:
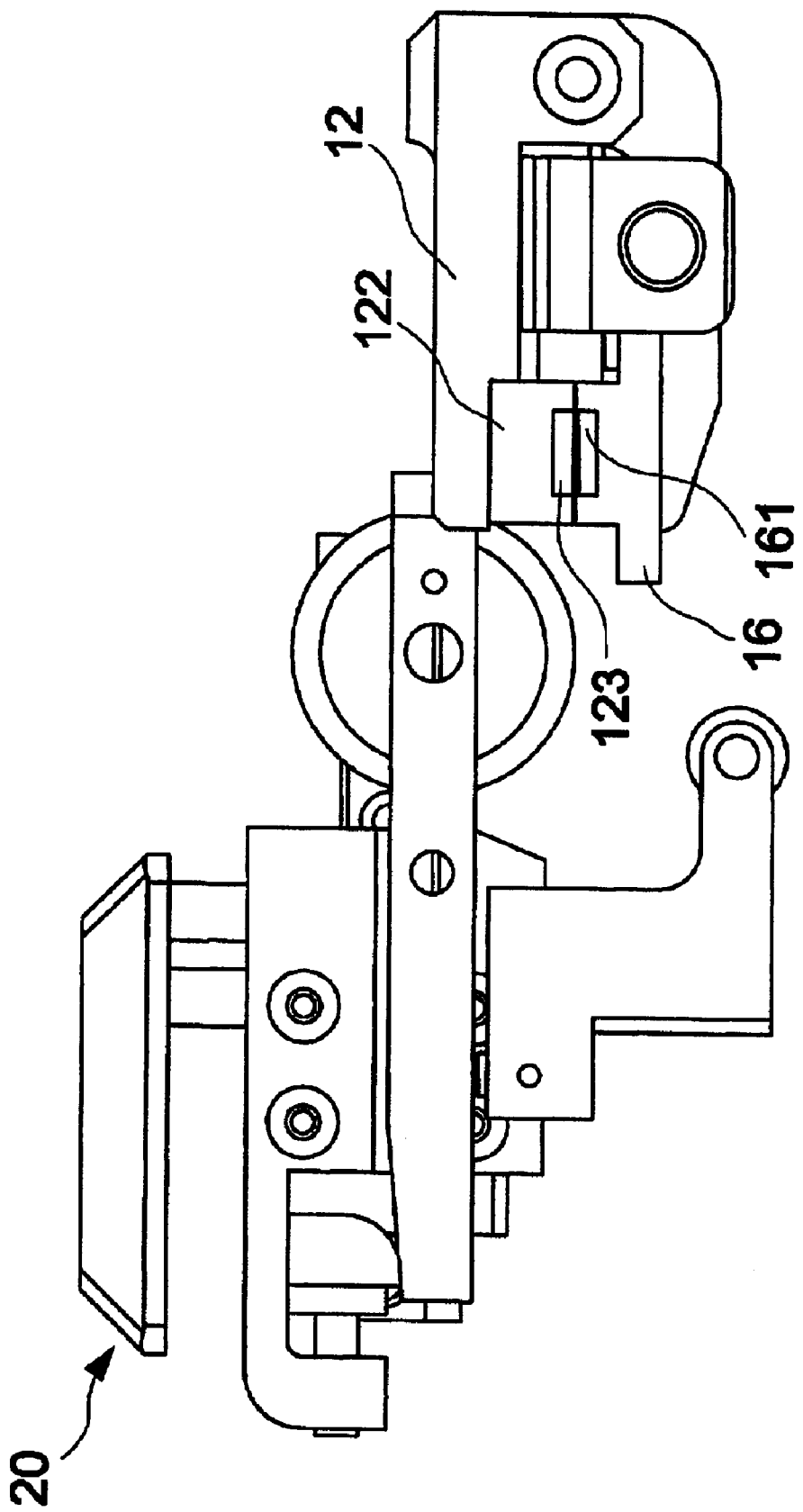
FIG. 5 and FIG. 6 are schematic views of the apparatus of FIG. 1 illustrating a cutting operation.
Figure 6:
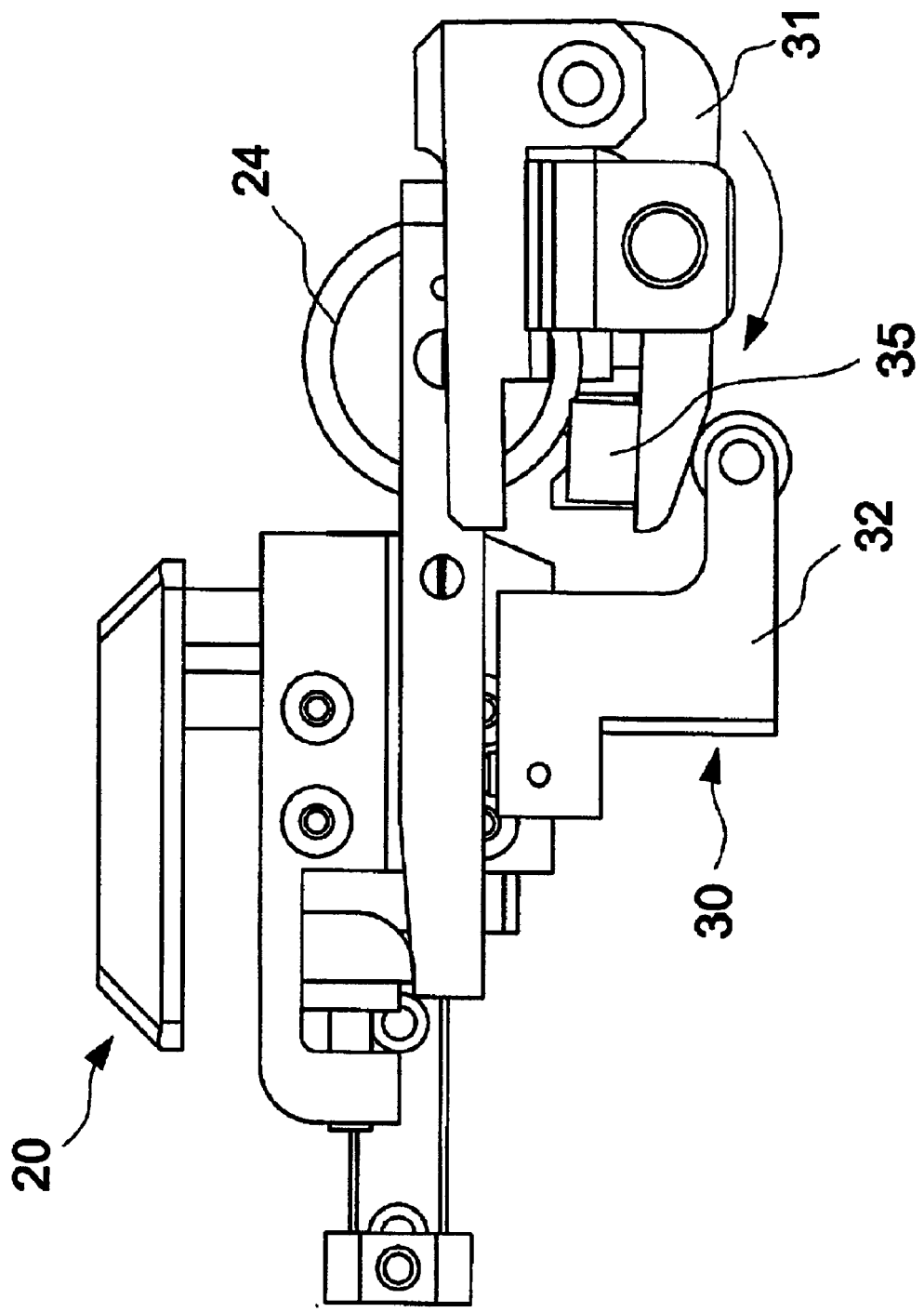

The operation of the optical fiber cutting apparatus of the invention is now described with the illustration of FIG. 1, FIG. 3, FIG. 4A, FIG. 4B, FIG. 5, and FIG. 6. A side of the optical fiber clamp 12 has a downward oblique face 124 while above the push-button switch 13 correspondingly has an upward oblique face 131. Hence, a pressure on the push-button switch 13 causes its oblique face 131 to abut against the oblique face 124 of the optical fiber clamp 12 (as shown in FIG. 4A), thereby opening the optical fiber clamp 12 (as shown in FIG. 3). After the optical fiber 1 to be cut is disposed on the optical fiber guiding supports 11, above the folder base 31, the push-button switch 13 is released and, via a resilient spring 132, the push-button switch 13 is repositioned (as shown in FIG. 4B). Via a torsion spring, the optical fiber clamp 12 is subsequently closed with the upper magnet 121 and the lower magnet 15 of the base 10 attracting to each other. As shown in FIG. 5, the rubber pads 123, 161 of both upper and lower clamping blocks 122, 16 thereby tightly abut against each other, and ensure a stable immobilization of the optical fiber 1 to be cut. Via a manual push on the pushing block 281, the slide base 28 slides along the slide rail 14 to displace the cutting blade 24 of the cutting device 20 and the bending device 30 toward the optical fiber 1. The cutting blade 24 passing over the optical fiber 1 let a precut trace on the optical fiber 1. With the pushing shaft 32 of the bending device 30, via its roller 32, slidably abutting the lower oblique face 34 of the bending base 31, the bending base 31 is consequently risen and, through the bending blade 35, cuts off the optical fiber 1 (as shown in FIG. 6).

Briefly summarized, the hand-held optical fiber cutting apparatus of the invention is operated according to the following manner. After an optical fiber 1 is adequately disposed on the optical fiber guiding supports 11 by one hand, the optical fiber clamp 12 is controlled to immobilize the optical fiber 1 by the other hand. Pushing by the hand, which optical fiber is disposed by the cutting device 20 and the bending device 30 slide along the slide rail 14 to perform cutting of the optical fiber 1 that is achieved via successively a precut followed by cutting off of the optical fiber 1. It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A hand-held optical fiber cutting apparatus comprising:
   a base;
   an optical fiber clamp including a pair of upper clamping blocks and lower clamping blocks to clamp the optical fiber and connecting on the base;
   a cutting device including a cutting blade for precutting the optical fiber, the cutting device further comprises a connecting rod and a slide base;
   a bending device for cutting off the precut optical fiber;
   an adjustment device is mounted onto the slide base of the cutting device to adjust the depth of the cutting trace of the cutting blade; and
   the adjustment device comprises an adjustment screw, an adjustment slider, and an adjustment set screw, the adjustment slider abutting an obligue face of the slide base.

2. The apparatus of claim 1, wherein the cutting blade is pivotably mounted to the connecting rod, and the connecting rod is pivotably mounted to the slide base.

3. The apparatus of claim 1, wherein the bending device comprises a pushing shaft, a roller, a bending base, and a bending blade.

4. The apparatus of claim 3, wherein a first extremity of the pushing shaft is fixedly attached onto the slide base while a second extremity of the pushing shaft carries the roller.

5. The apparatus of claim 3, wherein the bending base and the optical fiber clamp pivotably assemble with the base, and the bending blade is further mounted to the bending base.

6. The apparatus of any of claim 3, wherein the lower clamping block, the bending blade, and upper part of V-shaped grooves of optical fiber guiding supports are approximately at the same level when cutting is not performed.

7. The apparatus of any of claim 3, wherein the bending blade is mounted onto an upper side of the bending base.

8. The apparatus of claim 3, wherein the bending blade is further provided with a rubber pad.

9. The apparatus of claim 1, wherein an optical fiber guiding support is mounted onto the base.

10. The apparatus of claim 1, wherein a switch is further mounted onto the base to either open or close the optical fiber clamp.

11. The apparatus of claim 10, wherein the switch is provided with a spring, and operates via a pressure thereon to open the optical fiber clamp and via a release thereof to close the optical fiber clamp, the optical fiber clamp being further tightly locked after being closed via a pair of magnets.

12. The apparatus of claim 10, wherein the switch is a push-button switch provided with an upward oblique face that abuts against a downward oblique face of the optical fiber clamp for opening thereof.

13. The apparatus of claim 1, wherein the lower clamping block is placed between two optical fiber guiding supports.

14. The apparatus of claim 1, wherein the upper clamping block is placed in a lower side of the optical fiber clamp vis-a-vis the lower clamping block.

15. The apparatus of claim 1, wherein a rubber pad is respectively placed on the upper and lower clamping blocks.

16. The apparatus as in either claim 1 or claim 2, wherein the slide base of the cutting device is fixedly attached to a slide block that slides along a slide rail.

17. The apparatus of claim 1, wherein a pushing block is fixedly mounted on the slide base to slidably move the cutting device.

* * * * *